M. HARLOE.
RESILIENT TIRE.
APPLICATION FILED FEB. 28, 1920. RENEWED JUNE 20, 1921.
1,404,391.
Patented Jan. 24, 1922.
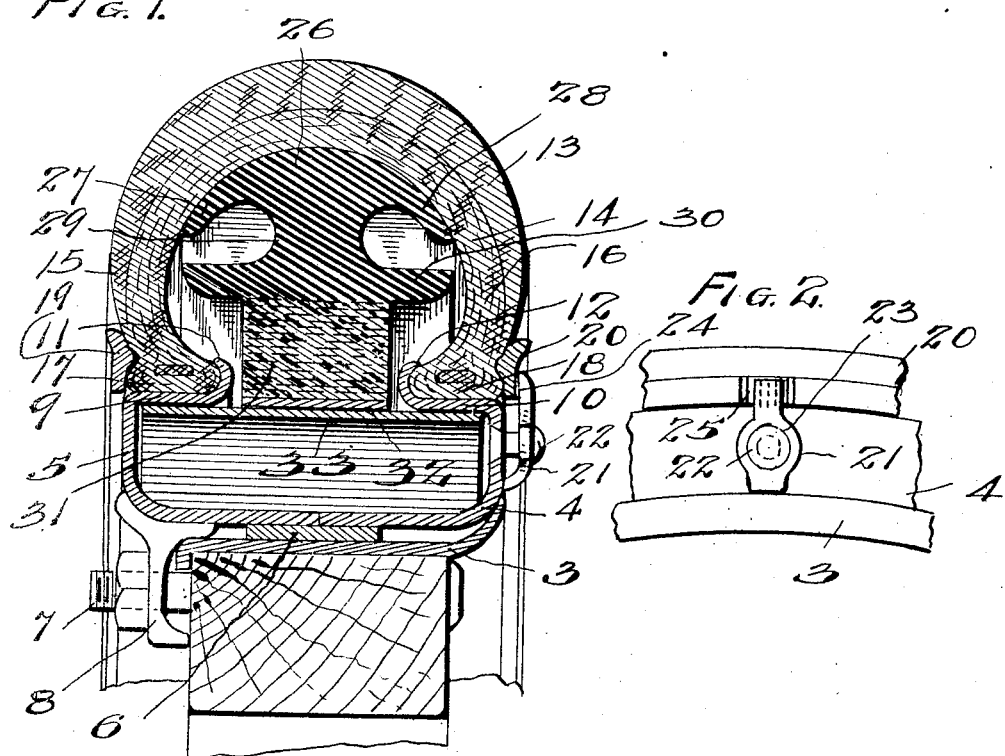
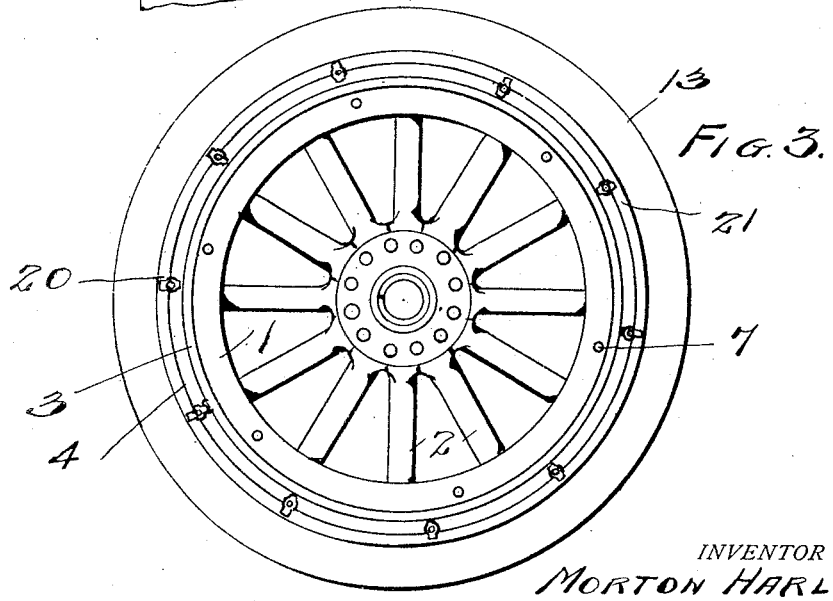
INVENTOR
MORTON HARLOE
Chas. K. Davis
Attorney

UNITED STATES PATENT OFFICE.

MORTON HARLOE, OF WINCHESTER, VIRGINIA.

RESILIENT TIRE.

1,404,391. Specification of Letters Patent. Patented Jan. 24, 1922.

Application filed February 28, 1920, Serial No. 361,970. Renewed June 20, 1921. Serial No. 479,083.

*To all whom it may concern:*

Be it known that I, MORTON HARLOE, a citizen of the United States, residing at Winchester, in the county of Frederick and State of Virginia, have invented certain new and useful Improvements in Resilient Tires, of which the following is a full, clear, and exact description, reference being had to the accompanying drawings, forming a part thereof.

The present invention relates to improvements in resilient tires for automobiles, trucks, and other vehicles, and is designed to provide a durable, strong and comparatively inexpensive tire of this type for receiving and absorbing the strains from a loaded vehicle, and for absorbing shocks and jerks in traveling due to irregularities in the road bed and from other causes.

The invention consists in certain novel combinations and arrangements with the flexible tire casing of interiorly arranged cushioning means and compressible means for absorbing movement of the tire casing due to loads thereon, and in the association of parts as will be hereinafter set forth and claimed.

In the accompanying drawings I have illustrated one complete example of the physical embodiment of my invention constructed according to the best mode I have so far devised for the practical application of the principles of my invention, and based upon extensive and careful study and experimentation, and actual use of the physically embodied invention. I have found in actual practice of the invention certain changes and adaptations may be made in the tire, but these changes will be within the scope of my claims and do not depart from the spirit of my invention.

In the drawings—

Figure 1 is a transverse sectional view through the wheel tire, rim, felly and other parts, showing the embodiment of my invention.

Figure 2 is a detail side view, showing the means for securing the clincher or retaining rings for the side walls of the tire casing.

Figure 3 is a view in side elevation showing a wheel embodying the invention.

In the preferred form of the invention as depicted in the drawings I have utilized the usual form of wood felly 1 and spokes 2, together with the usual iron band 3 which is shrunk upon the wood felly, and formed with side flanges for the rim section 4, which, together with the complementary section 5, forms the hollow, open, sectional rim for the tire. After the tire is mounted a metal ring or band 6 of proper width is forced in place between the band 3 and the rim sections 4 and 5 to underlap the edges of the sectional joint, for the purpose of frictionally holding the sectional rim and band 3.

The long bolts 7 spaced around and passing through the wood felly are also passed through the dogs 8 spaced as usual around the tire to clinch or clamp the sectional rim between the dogs and the flanged felly band 3, and by this means the rim is rigidly and securely held in place on the felly.

The rim sections are each formed with outer, comparatively wide and inwardly extending, transverse annular flanges as 9 and 10, leaving an open space between them communicating with the interior of the hollow rim, and these flanges are fashioned with circumferentially extending, preferably curved abutment flanges 11 and 12, which project outwardly from the rim sections as shown.

The tire casing may be of standard or acceptable form and is fashioned with its outer or tread portion 13 of well known stock material, and an inner portion 14 of composition fabric material, while its side walls 15 and 16 terminate in broad beads 17 and 18 having flat inner surfaces to seat upon the transverse flanges 9 and 10 of the rim sections, with their inner edges against the circumferential flanges 11 and 12 of the rim sections.

For holding the tire walls in place against lateral movement or spreading, I employ the side retaining rings 19 and 20, and the retaining rings are held in position by the utilization of spaced lugs or clamps 21, of which a suitable number are employed for the purpose, and pivoted on the rim sections by rivets or bolts 22. These clamp members are perforated at 23, for the bolt or rivet, and the engaging face of the lug is preferably longitudinally toothed or corrugated at 24 to engage complementary corrugations 25 on the rings 19 and 20. Thus it will be apparent that the clamp, which has its inner end bearing in close frictional contact on the rim, may be driven by hammer blows, or blows from a similar tool, to swing around and cause close frictional engagement with the ring for retaining the latter in place, and may with equal facility be released in similar manner.

The interior of the tire is formed with an annular cushion member 26, of live rubber, forming part of the tire casing, and fashioned with lateral walls 27 28 adhering to the inner face of the tire casing, a central web 29, and a flat base 30 which projects laterally beyond an annular pier 31, substantially rectangular in cross section and composed of laminated fabric or composition material that possesses flexibility. A pier ring 32 of resilient metal forms the base ring for the pier, and this base ring surrounds the wide master spring ring 33 which is inclosed in the hollow rim and retained therein by the transverse flanges of the rim.

It will be noted that the construction of the tire is simple, and that it is designed for strength and durability, while yet possessing sufficient flexibility and resiliency for performing its required functions, and because of its simplicity of construction and minimum number of parts, the cost of production is minimized.

As the two rim sections 4 and 5 are exact duplicates, it will be apparent that they may be produced with facility in quantities from the same mold and used at either side of the wheel, and the same advantage is gained by utilizing duplicate retaining rings 19 and 20. The laminated fabric, or composition material including the fabric may be wound upon the resilient base ring to form the pier and provide a substantial foundation for the cushion 26, which latter is made up of good quality springy or resilient rubber, and as the cushion is protected by the outer casing from wear, its durability is enhanced and insured against deterioration. The parts 31 and 26 are joined to adhere in usual manner as by heating, by an acid solution, or in other suitable means. After the completed flexible pier is placed in the tire casing, the outer surface of the pier, or rubber cushion, is joined to the interior surfaces of the casing by heat or acid as usual, thus providing a resilient, but substantial inner member of the tire, supported on the master spring 33.

It will be noted that the beads 17 and 18 of the side walls of the casing have a substantial and wide solid support on the transverse flanges of the rim sections, in order that the load of compression on the flexible tire case may be received before the movement of compression is transmitted to the rubber cushion. The flexibility of the tire casing permits an upward movement of the tread portion, when bearing a sufficient load, and this movement if great enough is transmitted through the rubber cushion to the fabric pier, which is of less resiliency and flexibility than the cushion.

Comparatively light loads cause a movement of the tire casing that may be absorbed by the cushion member 26 before reaching the fabric portion and spring 33. But under heavier loads, the greater compression movement of the tire casing is transmitted through the rubber casing, the flexible fabric pier, the pier ring and finally the master spring or band 33, where the movement is absorbed. The compression of the cushion member 26 it will be apparent is gradual, and excessive movement of the casing is absorbed before the spring 33 can reach the inner transverse walls of the hollow rim sections, by the edges of the base 30 of the rubber cushion contacting with and engaging the outer faces of the inwardly projecting beads 17 and 18 of the walls of the casing, and the resistance to the movement of the deformed or compressed tire casing increases as the compression of parts increases.

What I claim is—

1. The combination with a sectional rim and a resilient ring retained in the rim, of a flexible tire casing having an annular central rubber cushion and a flexible annular pier of fabric supported on the ring, flexible side walls to the casing supported on the rim, and means for clamping together said side walls and rim.

2. The combination with a hollow rim and a resilient ring retained therein, of a flexible tire casing formed with a central, annular rubber cushion and a lesser resilient pier member, and a pier ring between the pier member and resilient ring, flexible side walls to the tire casing supported on the rim, and said walls having inner beads in the path of movement of said rubber cushion.

3. The combination with a rim and a resilient ring retained therein, of a tire casing having side walls supported on the rim and formed with inner beads, an annular rubber cushion secured to the casing having a narrow web, and a wide base portion adapted to co-act with said beads, a fabric pier ring within the base portion, and a resilient, metallic pier ring between said fabric pier ring and said resilient ring.

4. The combination with a rim of a resiliently supported fabric pier ring, a tire casing having its side walls supported on said rim, a rubber, annular cushion within the casing, a narrow, integral, annular web on the cushion and a wide base to the web on said pier ring and projecting laterally of said pier ring, and said casing walls having inner beads to limit movement of said wide base.

In testimony whereof I hereby affix my signature.

MORTON HARLOE.